US012789786B2

(12) United States Patent
Al-Shanoon et al.

(10) Patent No.: US 12,789,786 B2
(45) Date of Patent: Nov. 10, 2026

(54) WIND MONITORING SYSTEM FOR A VEHICLE

(71) Applicant: GM Global Technology Operations LLC, Detroit, MI (US)

(72) Inventors: Abdulrahman Al-Shanoon, Toronto (CA); Utkarsh Saini, Pickering (CA); Michael D. Alarcon, Markham (CA); Mohammadali Shahriari, Markham (CA)

(73) Assignee: GM Global Technology Operations LLC, Detroit, MI (US)

( * ) Notice: Subject to any disclaimer, the term of this patent is extended or adjusted under 35 U.S.C. 154(b) by 7 days.

(21) Appl. No.: 18/955,873

(22) Filed: Nov. 21, 2024

(65) Prior Publication Data

US 2026/0138591 A1 May 21, 2026

(51) Int. Cl.
*B60W 30/02* (2012.01)
*B60Q 9/00* (2006.01)
(Continued)

(52) U.S. Cl.
CPC .............. *B60W 30/02* (2013.01); *B60Q 9/00* (2013.01); *G01P 5/24* (2013.01); *G07C 5/02* (2013.01);
(Continued)

(58) Field of Classification Search
CPC ............. B60W 30/02; B60W 2510/20; B60W 2520/10; B60W 2530/10;
(Continued)

(56) References Cited

U.S. PATENT DOCUMENTS

2024/0427338 A1* 12/2024 Kulakowski ......... G05D 1/1062

FOREIGN PATENT DOCUMENTS

CN 109774702 B * 4/2022
DE 102009003257 A1 11/2010
(Continued)

OTHER PUBLICATIONS

Machine Translation of CN 109774702 B PDF File Name: "CN109774702B_Machine_Translation.pdf" (Year: 2022).*
(Continued)

*Primary Examiner* — Grant Moubry
*Assistant Examiner* — Ruben Picon-Feliciano
(74) *Attorney, Agent, or Firm* — Honigman LLP; Matthew H. Szalach

(57) ABSTRACT

A computer-implemented method when executed by data processing hardware causes the data processing hardware to perform operations. The operations include defining, via a plurality of ultrasonic sensors, a plurality of detection zones, capturing, via the plurality of ultrasonic sensors, wind data from one or more of the plurality of detection zones, and determining, via a wind monitoring application, a wind direction and a wind magnitude based on the wind data. The operations also include receiving, at the wind monitoring application, weather data, executing, via the wind monitoring application, a fusion function on the wind data, the weather data, and vehicle dynamics to define fused wind data, executing, based on the fused wind data, a crosswind assist function of the wind monitoring application, and executing, via the wind monitoring application, lateral controls of the crosswind assist function.

20 Claims, 11 Drawing Sheets

(51) Int. Cl.
*G01P 5/24* (2006.01)
*G07C 5/02* (2006.01)

(52) U.S. Cl.
CPC ..... *B60W 2510/20* (2013.01); *B60W 2520/10* (2013.01); *B60W 2530/10* (2013.01); *B60W 2530/201* (2020.02); *B60W 2555/20* (2020.02); *B60W 2556/35* (2020.02)

(58) Field of Classification Search
CPC ....... B60W 2530/201; B60W 2555/20; B60W 2556/35; B60Q 9/00; G01P 5/24; G07C 5/02
See application file for complete search history.

(56) References Cited

FOREIGN PATENT DOCUMENTS

| | | | | |
|---|---|---|---|---|
| DE | 102019119537 A1 * | 1/2021 | ........ | B60W 50/0097 |
| DE | 102022130641 B3 | 3/2024 | | |

OTHER PUBLICATIONS

Machine Translation of DE 102019119537 A1 PDF File Name: "DE102019119537A1_Machine_Translation.pdf" (Year: 2021).*

* cited by examiner

WIND MONITORING SYSTEM FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a wind monitoring system for a vehicle.

Vehicles are often equipped with various sensors to detect the environmental surroundings of the vehicle. For example, vehicles may be equipped with image sensors, proximity sensors, or other sensors capable of detecting changes to the environment surrounding the vehicle. In some cases, vehicles may be equipped with sensors configured to detect rain and/or changes in daylight levels. Vehicles may also be in communication with off-board systems that may provide weather data to a controller of the vehicle. While the weather data may provide the controller with generalized information as to the surrounding environment, there is a need for an improved vehicle system that monitors the impact of weather events, such as crosswinds, relative to the vehicle.

SUMMARY

In some aspects, a computer-implemented method when executed by data processing hardware causes the data processing hardware to perform operations. The operations include defining, via a plurality of ultrasonic sensors, a plurality of detection zones, capturing, via the plurality of ultrasonic sensors, wind data from one or more of the plurality of detection zones, and determining, via a wind monitoring application, a wind direction and a wind magnitude based on the wind data. The operations also include receiving, at the wind monitoring application, weather data, executing, via the wind monitoring application, a fusion function on the wind data, the weather data, and vehicle dynamics to define fused wind data, executing, based on the fused wind data, a crosswind assist function of the wind monitoring application, and executing, via the wind monitoring application, lateral controls of the crosswind assist function.

In some examples, executing the crosswind assist function may include issuing an alert at a user interface of a vehicle. The operations may also include receiving, at the wind monitoring application, object data. The object data may include vehicle data and trailer data, and the trailer data may include one or more of trailer dimensions, trailer mass, and axle count and the vehicle data including vehicle speed and steering angle. The operations may further include executing, based on the fused wind data and the object data, a criticality function and generating, via the criticality function, a criticality value based on the object data. Optionally, executing the crosswind assist function may include adjusting the lateral controls based on the criticality value. The operations may also include determining, based on the fused wind data, at least one of the wind direction and the wind magnitude exceed the criticality value. The operations further include issuing an alert in response to one of the wind direction and the wind magnitude exceeding the criticality value.

In other aspects, a wind monitoring system includes data processing hardware and memory hardware in communication with the data processing hardware. The memory hardware stores instructions that when executed on the data processing hardware cause the data processing hardware to perform operations. The operations include defining, via a plurality of ultrasonic sensors, a plurality of detection zones, capturing, via the plurality of ultrasonic sensors, wind data from one or more of the plurality of detection zones, determining, via a wind monitoring application, a wind direction and a wind magnitude based on the wind data, and receiving, at the wind monitoring application, weather data. The operations also include executing, via the wind monitoring application, a fusion function on the wind data, the weather data, and vehicle dynamics to define fused wind data, executing, based on the fused wind data, a crosswind assist function of the wind monitoring application, and executing, via the wind monitoring application, lateral controls of the crosswind assist function.

In some examples, executing the crosswind assist function may include issuing an alert at a user interface of a vehicle. The operations may also include receiving, at the wind monitoring application, object data. Optionally, the object data may include vehicle data and trailer data, and the trailer data may include one or more of trailer dimensions, trailer mass, and axle count and the vehicle data including vehicle speed and steering angle. The operations may also include executing, based on the fused wind data and the object data, a criticality function and generating, via the criticality function, a criticality value based on the object data. In some instances, executing the crosswind assist function may include adjusting the lateral controls based on the criticality value. The operations may also include determining, based on the fused wind data, at least one of the wind direction and the wind magnitude exceed the criticality value. The operations may further include issuing an alert in response to one of the wind direction and the wind magnitude exceeding the criticality value.

In other aspects, a wind monitoring system includes data processing hardware and memory hardware in communication with the data processing hardware. The memory hardware stores instructions that when executed on the data processing hardware cause the data processing hardware to perform operations. The operations include defining, via a plurality of ultrasonic sensors, a plurality of detection zones, capturing, via the plurality of ultrasonic sensors, wind data from one or more of the plurality of detection zones, determining, via a wind monitoring application, a wind direction and a wind magnitude based on the wind data, and receiving, at the wind monitoring application, weather data. The operations also include executing, via the wind monitoring application, a fusion function on the wind data, the weather data, and vehicle dynamics to define fused wind data, receiving, at the wind monitoring application, object data, executing, based on the fused wind data and the object data, a criticality function, and generating, via the criticality function, a criticality value based on the object data. The operations further include determining, based on the fused wind data, at least one of the wind direction and the wind magnitude exceed the criticality value, executing, based on the fused wind data and one of the wind direction and the wind magnitude exceeding the criticality value, a crosswind assist function of the wind monitoring application, executing, via the wind monitoring application, lateral controls of the crosswind assist function, and issuing an alert in response to one of the wind direction and the wind magnitude exceeding the criticality value.

In some examples, the object data may include vehicle data and trailer data, the trailer data including one or more of trailer dimensions, trailer mass, and axle count and the vehicle data including vehicle speed and steering angle. Optionally, executing the crosswind assist function may include adjusting the lateral controls based on the criticality value. The operations may also include issuing an alert in response to one of the wind direction and the wind magnitude exceeding the criticality value.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
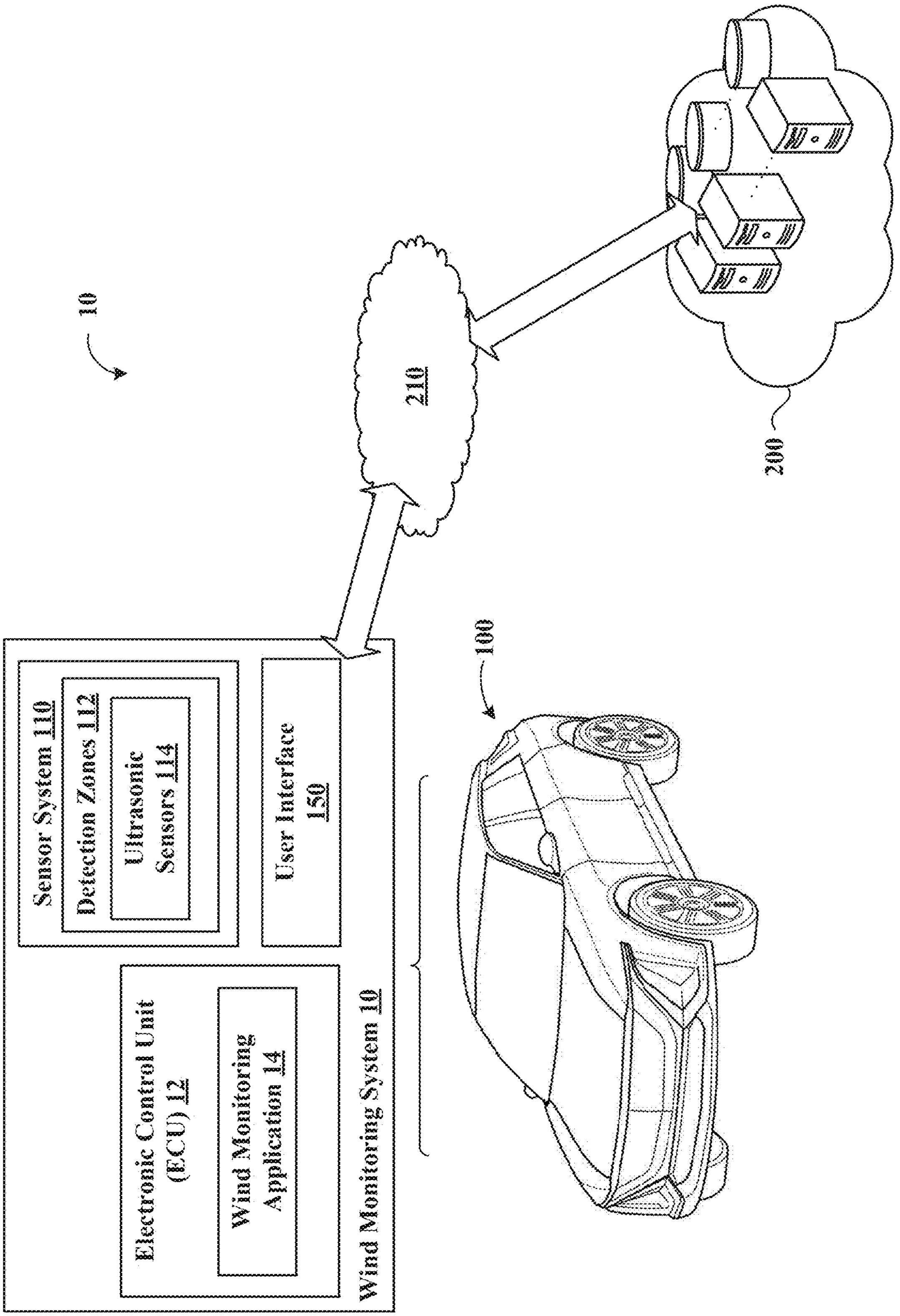
FIG. 1 is a schematic diagram of a vehicle equipped with a wind monitoring system according to the present disclosure.
Figure 2:
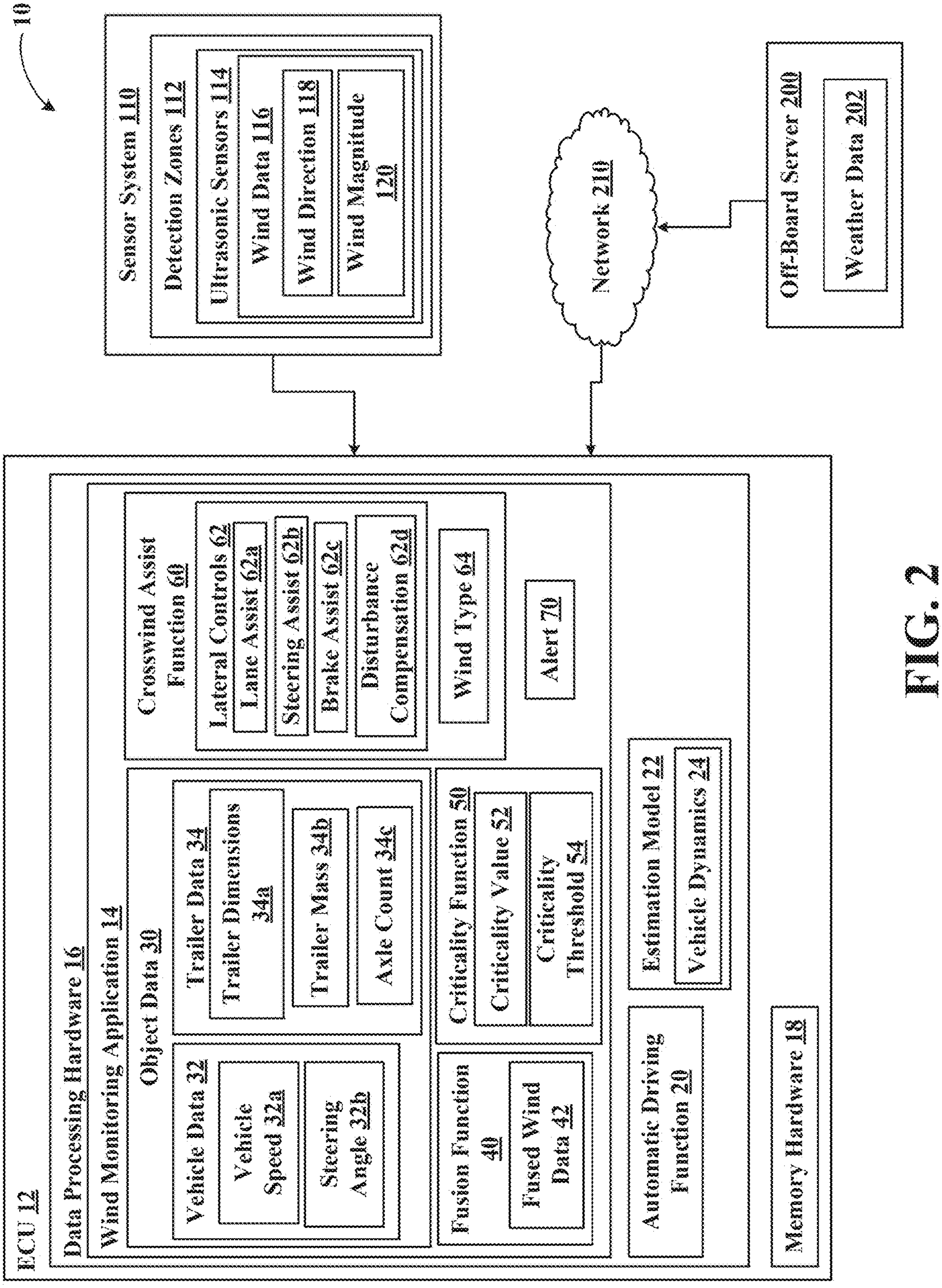
FIG. 2 is an exemplary block diagram for a wind monitoring system according to the present disclosure.
Figure 3:
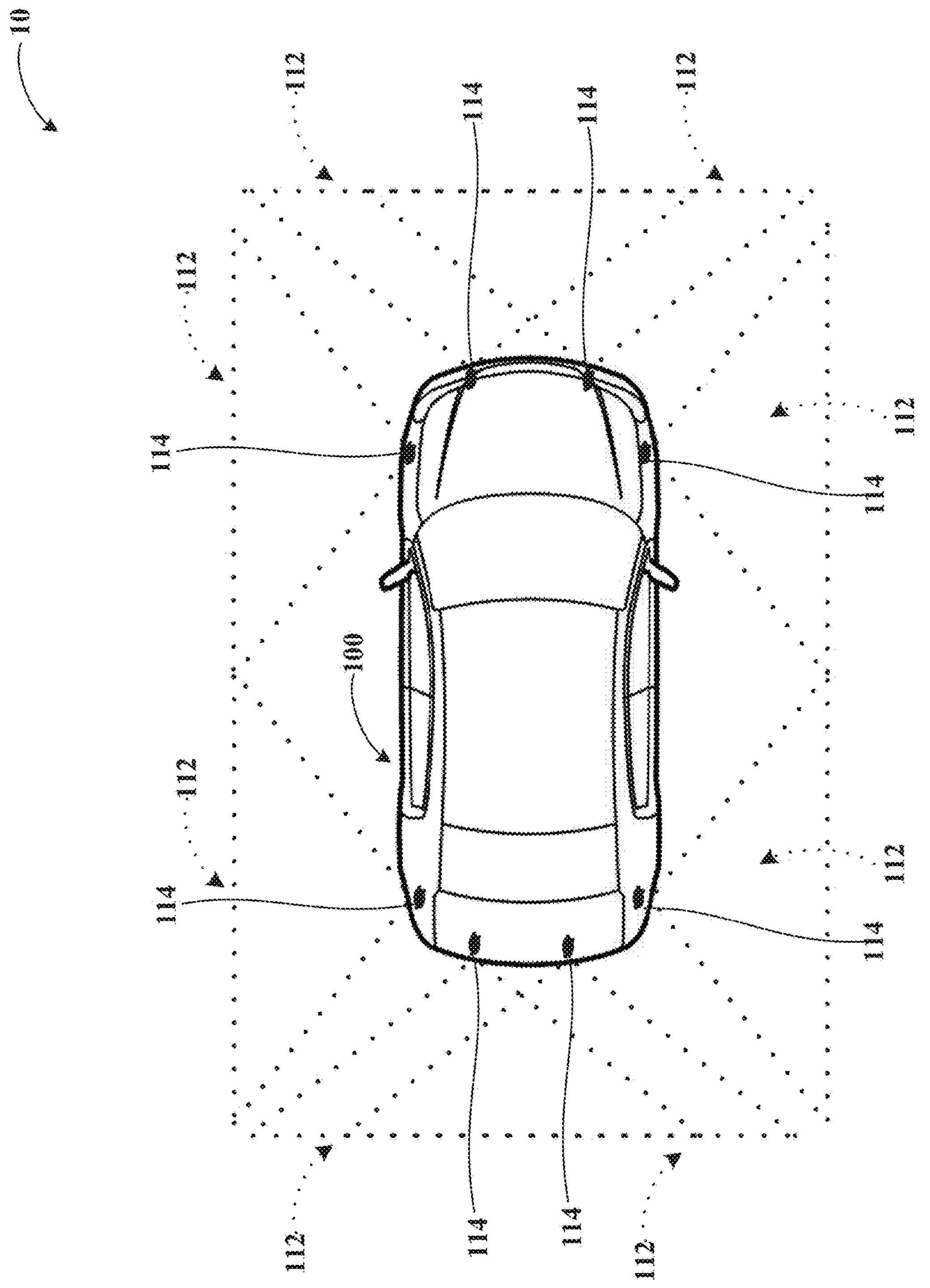
FIG. 3 is a schematic diagram of a vehicle equipped with a plurality of ultrasonic sensors according to the present disclosure to define a plurality of detection zones.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIGS. 1-4D, a wind monitoring system 10 includes an electronic control unit (ECU) 12 of a vehicle 100, which is communicatively coupled with an off-board server 200 via a network 210. The off-board server 200 may be configured as a back-office server, a third-party server, or any other server that may be utilized to communicate with the ECU 12 of the vehicle 100 either directly or via the network 210. The off-board server 200 is configured to communicate weather data 202 with the vehicle 100, which is utilized as part of a wind monitoring application 14 of the ECU 12, described in more detail below.

The vehicle 100 is also equipped with a sensor system 110 that defines a plurality of detection zones 112 around the vehicle 100. Within each detection zone 112 is at least one ultrasonic sensor 114 configured to capture wind data 116. The wind data 116 is captured by the ultrasonic sensors 114 and includes wind direction 118 and wind magnitude 120.

The wind data 116 is transmitted to the wind monitoring application 14 of the ECU 12. The wind monitoring application 14 is executed by data processing hardware 16 of the ECU 12. The ECU 12 also includes memory hardware 18 in communication with the data processing hardware 16. The memory hardware 18 stores instructions that when executed on the data processing hardware 16 cause the data processing hardware 16 to perform operations described herein.

The data processing hardware 16 also executes an automatic driving function 20 of the vehicle 100 and an estimation model 22. The automatic driving function 20 may include operating the vehicle 100 on an automated basis, such as utilizing a cruise control function or other automated driving features. The estimation model 22 is configured to generate vehicle dynamics 24, which are utilized by the wind monitoring application 14, described herein. The wind monitoring application 14 includes object data 30, which may be configured with the wind monitoring application 14, may be detected by the sensor system 110, and/or may be input by a user. For example, the object data 30 includes vehicle data 32 and trailer data 34.

The vehicle data 32 may be captured by the sensor system 110 and includes a vehicle speed 32*a* and a steering angle 32*b*. The vehicle data 32 may vary during operation of the vehicle 100, such that the vehicle data 32 may be continually updated to capture a current vehicle speed 32*a* and a current steering angle 32*b*. The trailer data 34 may be input by a user and includes trailer dimensions 34*a*, trailer mass 34*b*, and an axle count 34*c*. In some examples, the vehicle data 32 and the trailer data 34 may also include other components or data features.

The wind monitoring application 14 is also configured with a fusion function 40. The fusion function 40 is configured to fuse together the vehicle dynamics 24 from the estimation model 22, the wind data 116 from the sensor system 110, and the weather data 202 from the off-board server 200 to generate fused wind data 42 that is utilized by the wind monitoring application 14. The wind monitoring application 14 continuously receives the wind data 116 and the weather data 202, such that the fused wind data 42 may be continually updated to reflect changes in the wind data 116 and the weather data 202.

The wind monitoring application 14 is also configured with a criticality function 50. The criticality function 50 utilizes the fused wind data 42 and the object data 30 to generate a criticality value 52. The wind monitoring application 14 may execute the criticality function 50 based on the object data 30. The criticality value 52 is relative to the object data 30, such that the criticality function 50 utilizes the object data 30 to determine the criticality value 52. For example, the criticality function 50 may determine that the trailer data 34 may be susceptible to impact based on the fused wind data 42, such that the criticality value 52 may exceed a criticality threshold 54 based on the object data 30 (i.e., trailer dimensions 34*a*, trailer mass 34*b*, and/or axle count 34*c*). The criticality value 52 may be utilized by the wind monitoring application 14 to determine whether to execute a crosswind assist function 60.

For example, the crosswind assist function 60 may include lateral controls 62 based on the wind type 64 identified from the fused wind data 42. The lateral controls 62 include, but are not limited to, lane assist 62*a*, steering assist 62*b*, brake assist 62*c*, and/or disturbance compensation 62*d*. The crosswind assist function 60 may also issue an alert 70 at a user interface 150 (FIG. 1) of the vehicle 100 in addition to executing the lateral controls 62 of the crosswind assist function 60. The wind monitoring application 14 may utilize the fused wind data 42 to determine which of the lateral controls 62 to execute as part of the crosswind assist function 60.

The wind data 116 may alter or otherwise change during operation of the vehicle 100. Potential changes to the wind data 116 may result in the criticality function 50 adjusting or otherwise modifying the criticality value 52. For example, the wind direction 118 may change, such that the fused wind data 42 relative to the object data 30 may result in an alerted criticality value 52. As a result, the criticality value 52 may increase further above the criticality threshold 54 and/or may fall below the criticality threshold 54. The wind monitoring application 14 may, in response, adjust the lateral controls 62. In some instances, the wind monitoring application 14 may execute additional lateral controls 62 and/or may deactivate the lateral controls 62 based on the criticality value 52.

The wind monitoring application 14 is configured to compare the wind direction 118 and the wind magnitude 120 with the criticality value 52, which may also be utilized to determine whether to execute the lateral controls 62 and/or issue the alert 70. For example, the wind monitoring application 14 may determine that at least one of the wind direction 118 and the wind magnitude 120 exceeds the criticality value 52, which in turn would mean the criticality value 52 would exceed the criticality threshold 54. In response, the wind monitoring application 14 may execute the crosswind assist function 60 to execute one or more of the lateral controls 62. In some instances, the wind monitoring application 14 may issue the alert 70 and await an input response from a user prior to executing the lateral controls 62. If the automatic driving function 20 of the vehicle 100 is activated, then the wind monitoring application 14 may automatically execute the lateral controls 62 and issue the alert 70.

The alert 70 may be configured as a haptic alert, an audible alert, and/or an icon on the user interface 150 (FIG. 1). For example, the alert 70 may be issued as a chime within the vehicle 100, include a written warning on the user interface 150, and/or may vibrate a steering wheel of the vehicle 100. The alert 70 is configured to notify the user (i.e., a driver and/or occupant) of the vehicle 100 that the wind conditions are not suitable based on the object data 30. Thus, the alert 70 may advise the driver to pullover or slow a speed of the vehicle 100 based on the fused wind data 42, the object data 30, and the criticality value 52. As mentioned above, if the automatic driving functions 20 of the vehicle 100 are activated, the wind monitoring application 14 may automatically adjust the operations of the vehicle 100 via the execution of the lateral controls 62, while still providing the alert 70.

Figure 4A:
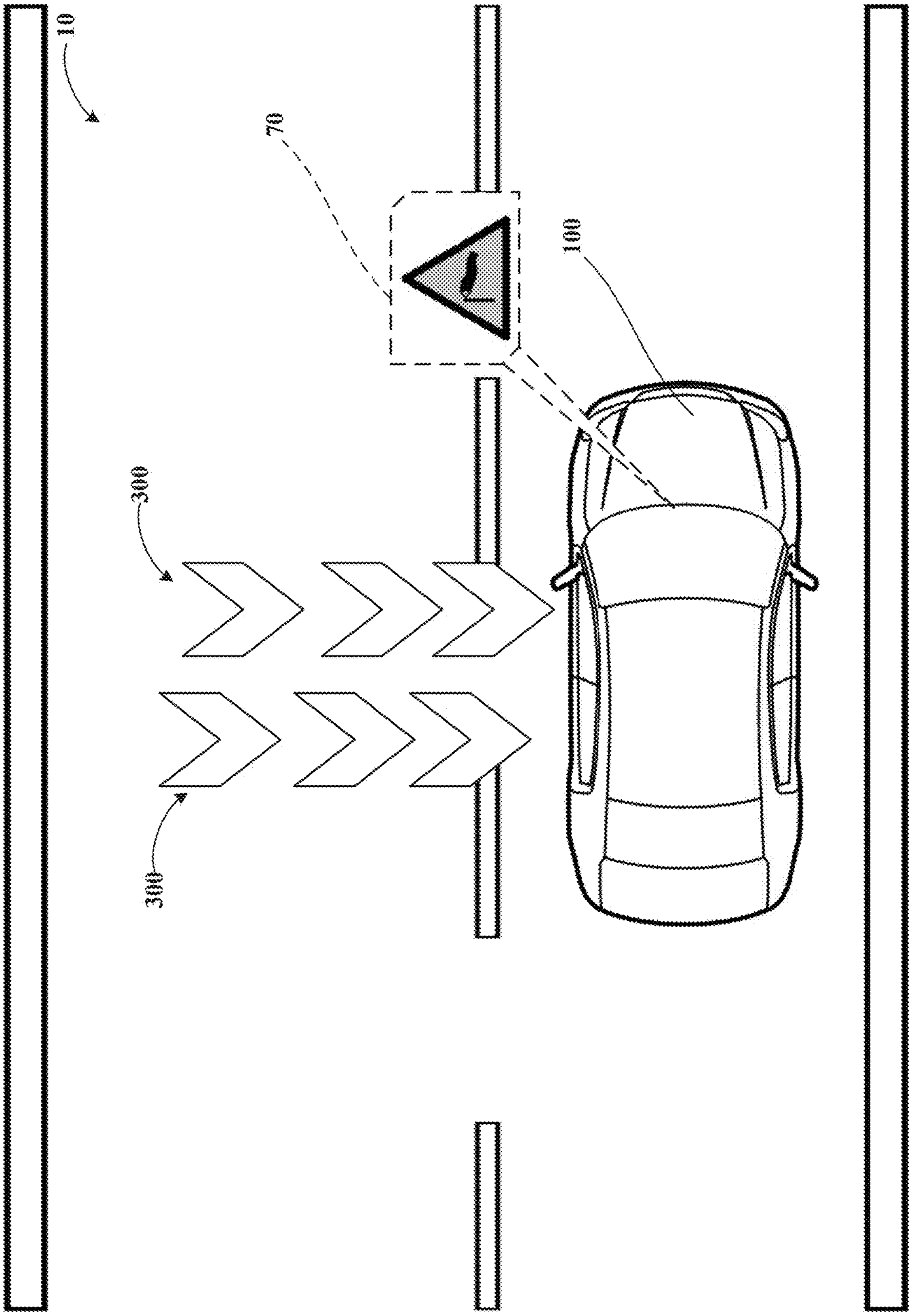
FIG. 4A is a schematic diagram of a vehicle equipped with a wind monitoring system according to the present disclosure, the vehicle experiencing a crosswind.
Figure 4B:
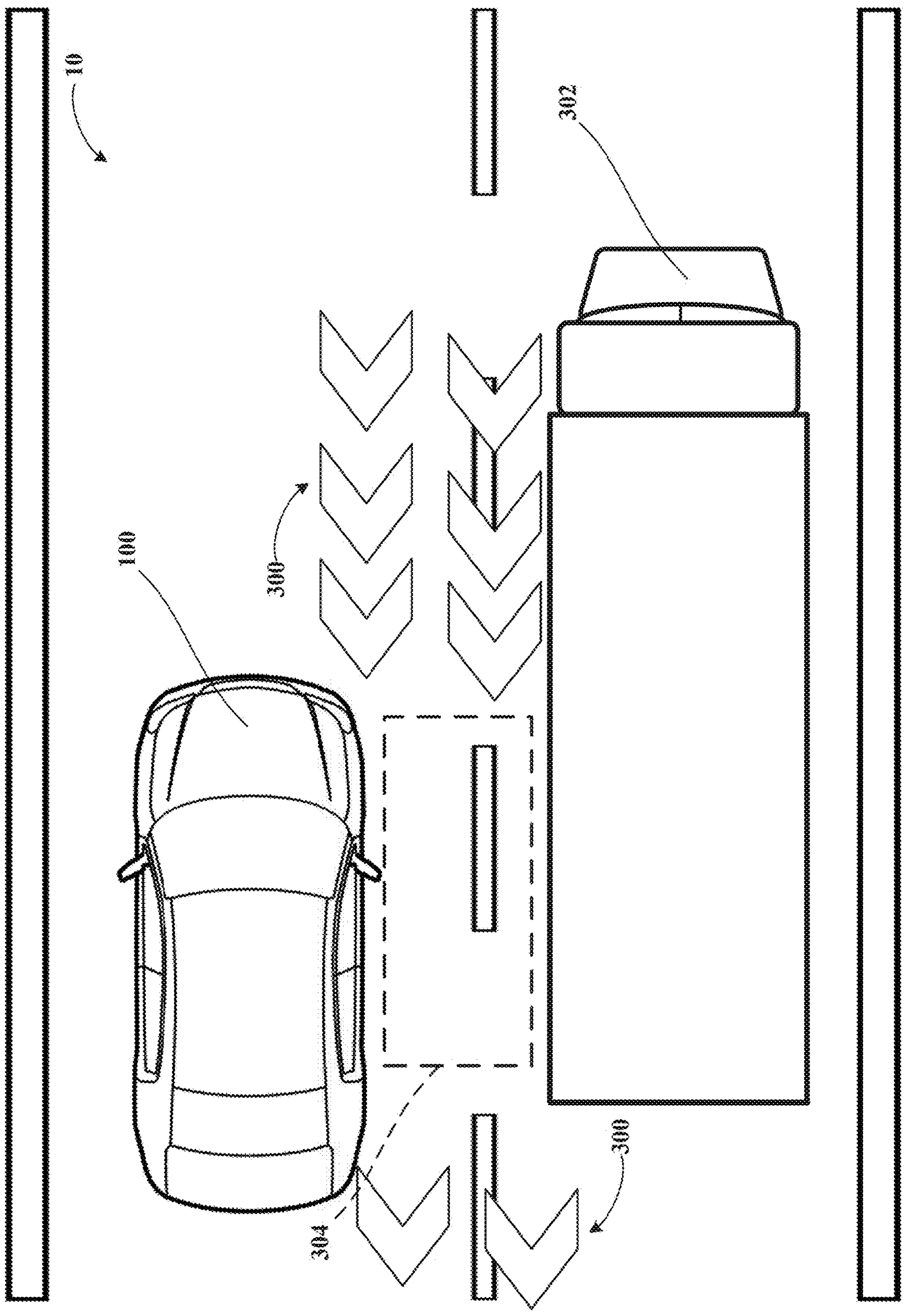
FIG. 4B is another schematic diagram of a vehicle equipped with a wind monitoring system according to the present disclosure, the vehicle experiencing an impact wind while passing another vehicle.
Figure 4C:
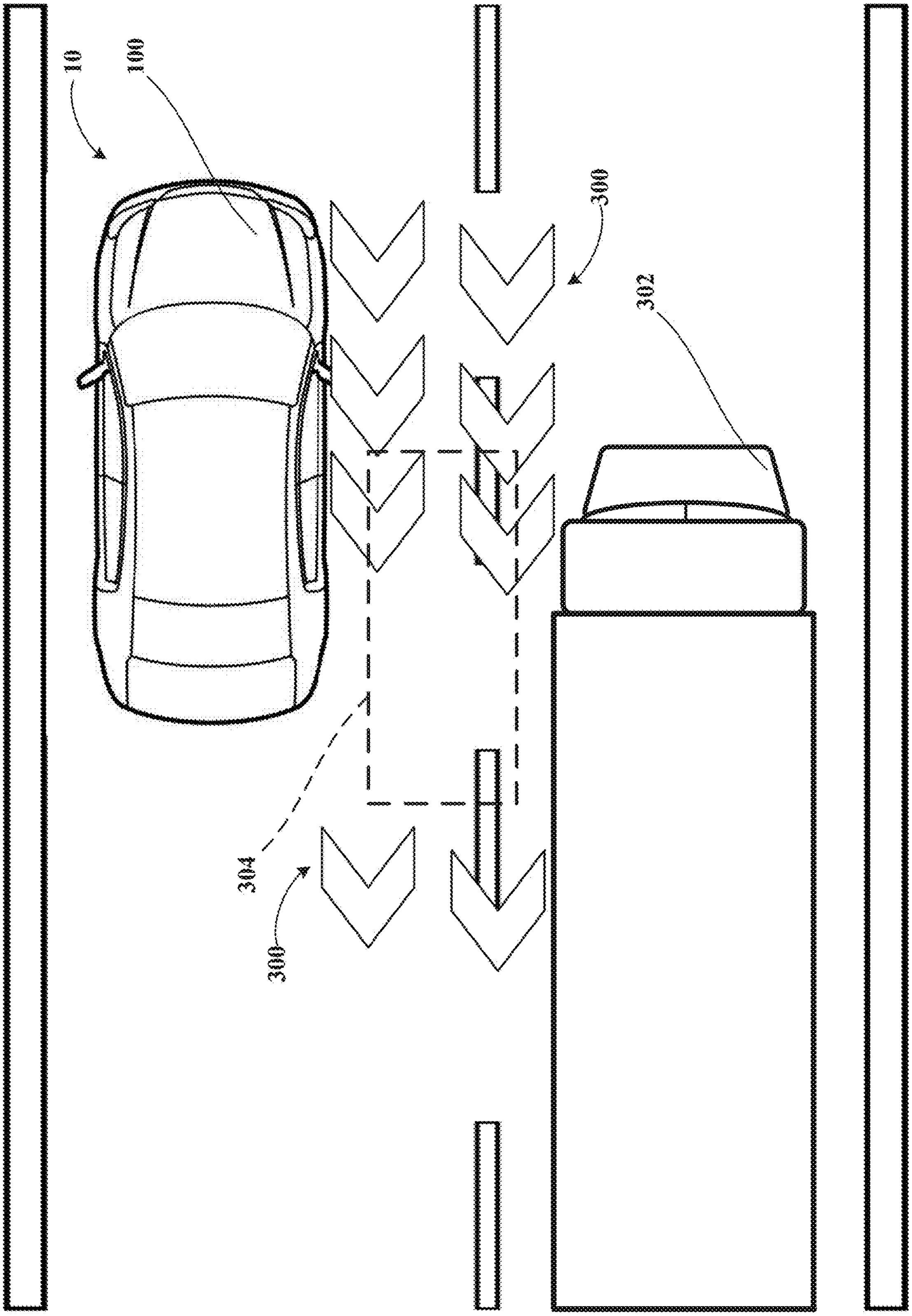
FIG. 4C is a further schematic diagram of a vehicle equipped with a wind monitoring system according to the present disclosure, the vehicle experiencing an impact wind while being passed by another vehicle.
Figure 4D:
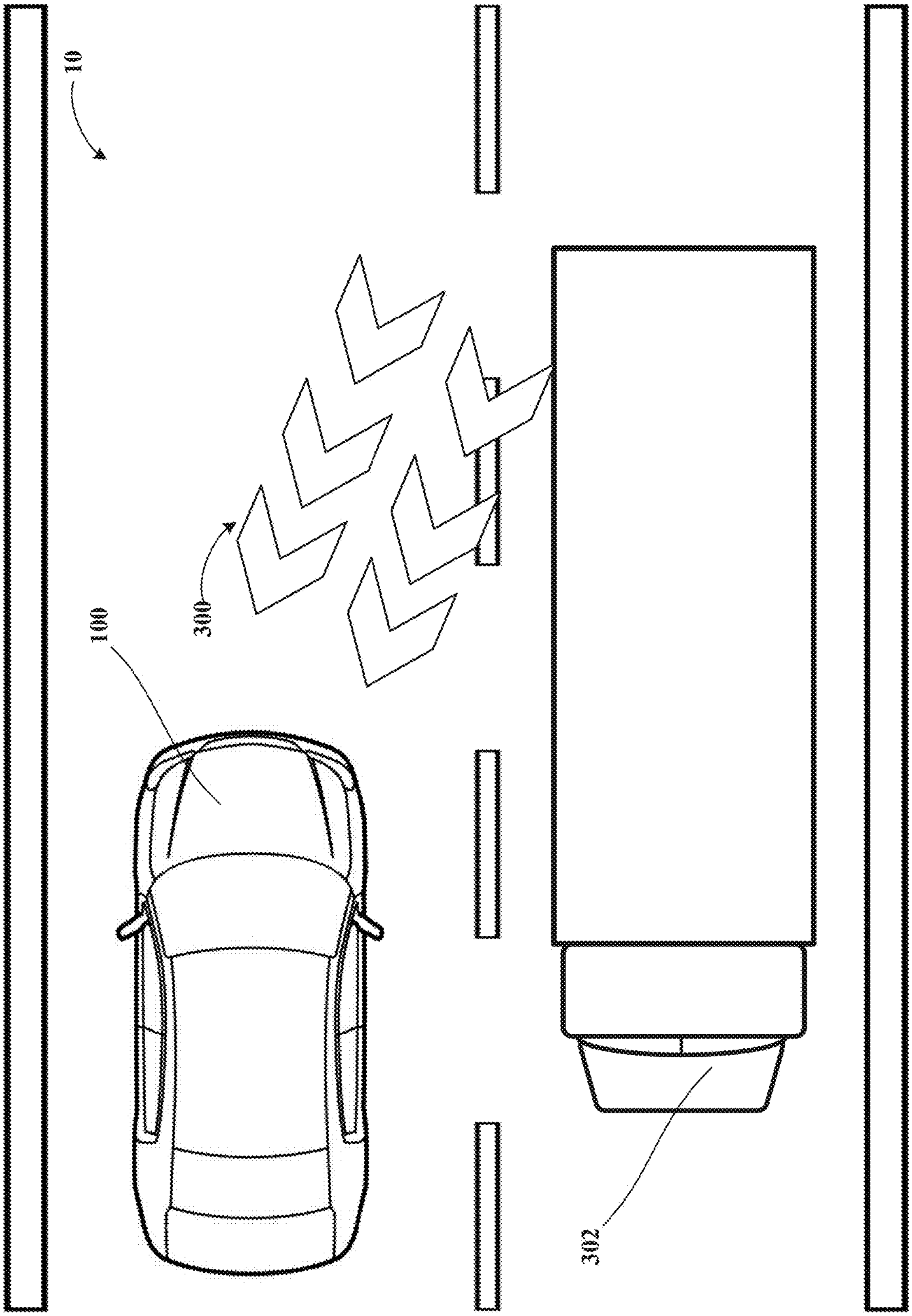
FIG. 4D is yet another schematic diagram of a vehicle equipped with a wind monitoring system according to the present disclosure, the vehicle experiencing an impact wind while passing an oncoming vehicle.

With further reference to FIGS. 2-4D, the wind monitoring application 14 is configured to detect an impact wind 300 that may result from a crosswind and/or a pull force from passing vehicles 302. For example, FIG. 4A illustrates a vehicle 100 experiencing a crosswind 300 and FIGS. 4B-4D illustrate an impact wind 300 generated by a vehicle 100 passing and/or being passed by another vehicle 302 (i.e., a semitruck). The impact wind 300 is detected by the ultrasonic sensors 114. While the impact wind 300 may be directed at a side of the vehicle 100, the impact wind 300 may come from various directions. The ultrasonic sensors 114 are disposed around the vehicle 100 to define the detection zones 112.

The detection zones 112 are configured to overlap with one another, such that the impact wind 300 may be captured regardless of an approach angle of the impact wind 300.

Further, the ultrasonic sensors 114 are configured to capture the impact wind 300 regardless of the approach angle relative to the ultrasonic sensors 114. For example, while the impact wind 300 may have an approach angle that is perpendicular to the vehicle 100, the ultrasonic sensors 114 are configured to detect the impact wind 300 even if the approach angle of the impact wind is not perpendicular. For example, FIG. 4D illustrates an angular direction of the impact wind 300, which is detectable by the ultrasonic sensors 114. The impact wind 300 is captured by the ultrasonic sensors 114 as the wind data 116, such that the ultrasonic sensors 114 capture the wind direction 118 and the wind magnitude 120.

As illustrated in FIGS. 4B and 4C, the impact wind 300 may be further defined by a low-pressure zone 304 between the vehicle 100 and the passing vehicle 302. The impact wind 300 may be defined by a size differential between the vehicle 100 and the passing vehicle 302. For example, the passing vehicle 302 is illustrated as a semi-truck, which may result in a greater pull force between the vehicles 100, 302. As a result, the low-pressure zone 304 is defined between the vehicle 100 and the passing vehicle 302, as the vehicle 100 passes or is being passed by the passing vehicle 302. The low-pressure zone 304 is a result of a greater pressure on an opposing side of the vehicle 100 and the passing vehicle 302, such that the area between the vehicle 100 and the passing vehicle 302 creates a low-pressure zone 304 through which the impact wind 300 passes. Further, as the impact wind 300 passes through the low-pressure zone 304, the impact wind 300 may garner speed, which further defines the low-pressure zone 304.

Each of the scenarios illustrated in FIGS. 4A-4D depict different scenarios in which the impact wind 300 may result in the wind monitoring application 14 triggering the crosswind assist function 60. Thus, the wind monitoring application 14 is configured to distinguish between different impact wind 300 scenarios by assessing the wind direction 118 and wind magnitude 120 captured in the wind data 116. Further, the fusion function 40 utilizes the vehicle dynamics 24 and the weather data 202 from the off-board server to compare with the wind data 116 and generate the fused wind data 42. The fused wind data 42 represents the wind monitoring application 14 identifying varied scenarios and adapting the response (i.e., the lateral controls 62) based on the identified scenario.

Figure 5:
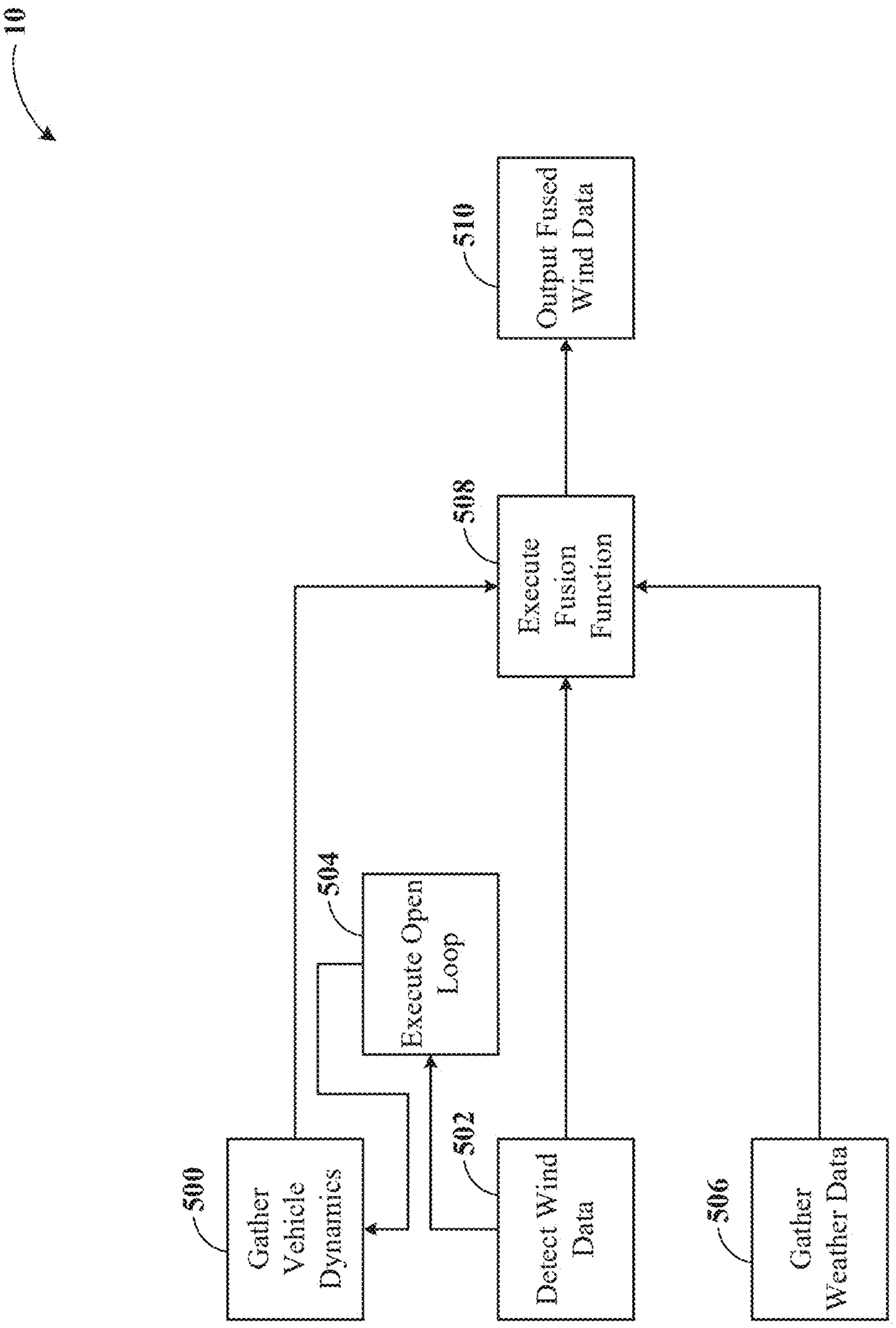
FIG. 5 is an exemplary flow diagram for a wind monitoring system according to the present disclosure.

FIG. 5 illustrates an exemplary flow chart of the fusion function 40 of the wind monitoring application 14. The vehicle dynamics 24 are gathered, at 500, and the ultrasonic sensors 114 detect the wind data 116, at 502. For high-sided vehicles 100, an open loop is executed, at 504, between the gathered vehicle dynamics 24 and the detected wind data 116. At 506, the weather data 202 is gathered, and the wind monitoring application 14 executes, at 508, the fusion function 40. The fusion function 40 receives, at 508, the vehicle dynamics 24, the wind data 116, and the weather data 202 and outputs, at 510, the fused wind data 42.

Figure 6:
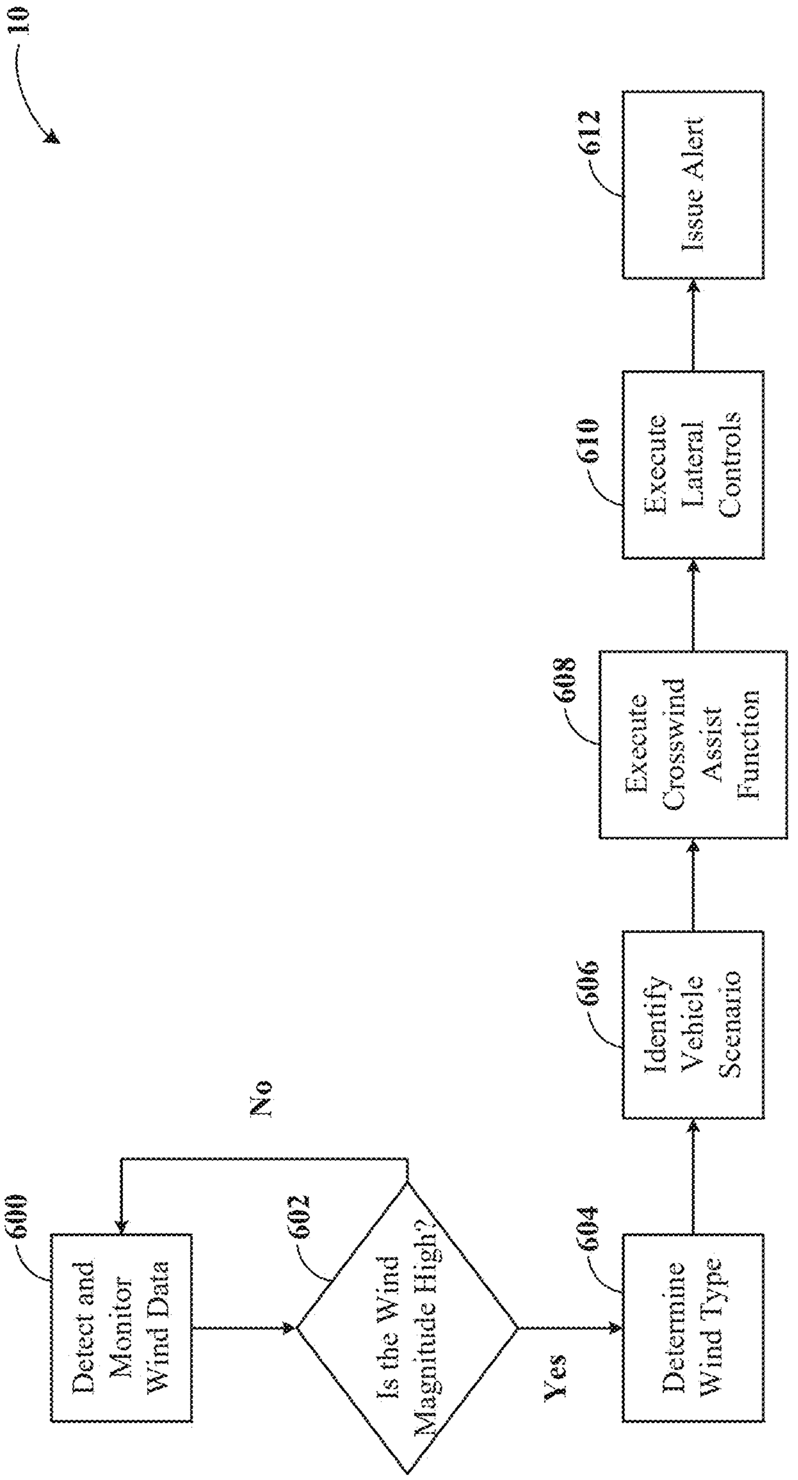
FIG. 6 is another exemplary flow diagram for a wind monitoring system according to the present disclosure.

FIG. 6 illustrates an exemplary flow chart for execution of the crosswind assist function 60. At 600, the ultrasonic sensors 114 detect the wind data 116 and the wind monitoring application 14 monitors the wind data 116. At 602, the wind monitoring application 14 determines whether the wind magnitude 120 is high. If not, then the wind monitoring application 14 continues to monitor the wind data 116 detected by the ultrasonic sensors 114. If the wind magnitude 120 is high, then the wind monitoring application 14 may identify, at 604, the wind type 64 and identify, at 606, the vehicle scenario. The wind monitoring application 14 may then execute, at 608, the crosswind assist function 60 and execute, at 610, the lateral controls 62. In response, the wind monitoring application 14 issues, at 612, the alert 70.

Figure 7:
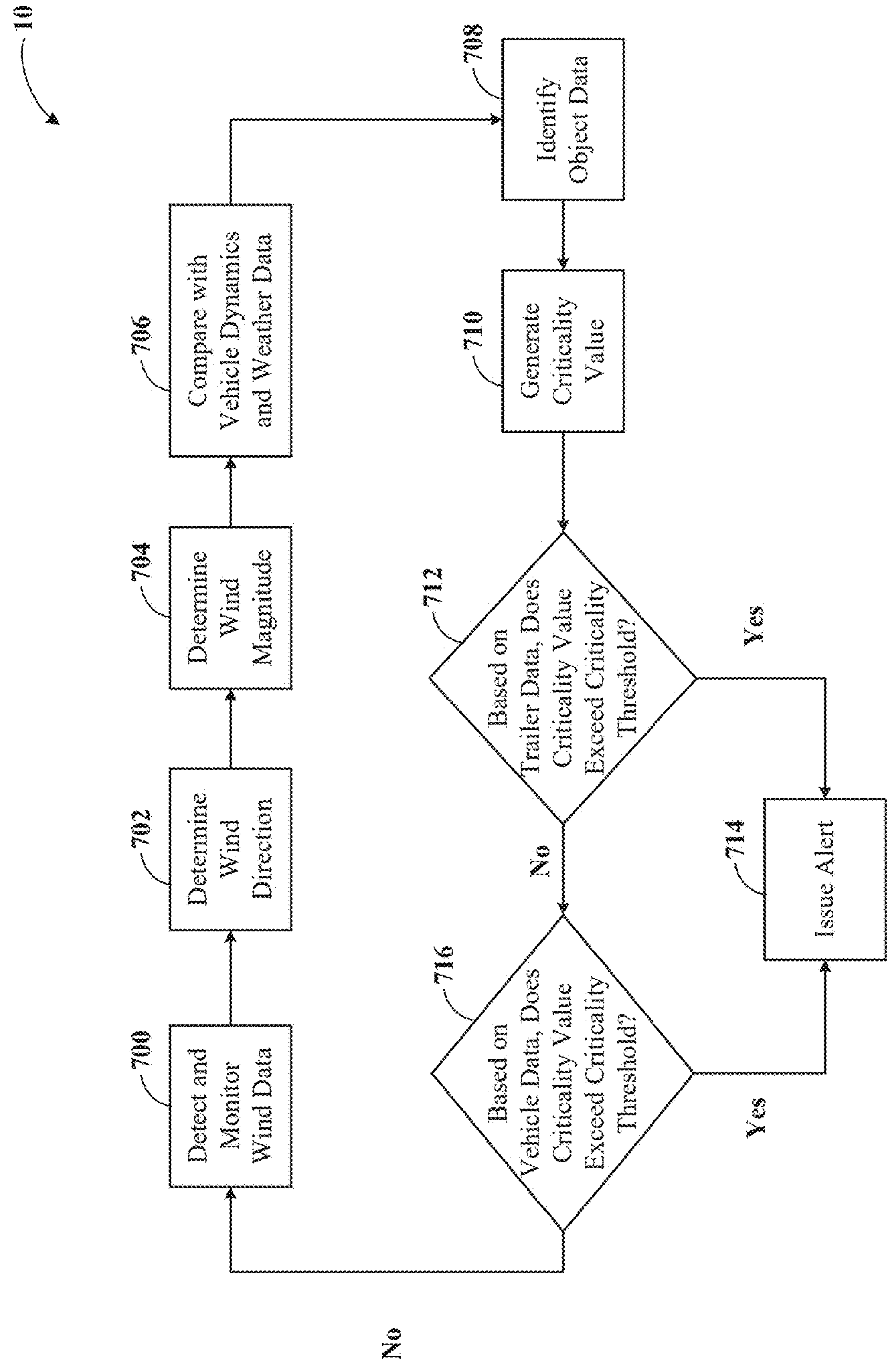
FIG. 7 is a further exemplary flow diagram for a wind monitoring system according to the present disclosure.

FIG. 7 illustrates another exemplary flow diagram for the wind monitoring application 14 determining the criticality value 52. At 700, the ultrasonic sensors 114 detect the wind data 116, and the wind monitoring application 14 monitors the wind data 116. The wind monitoring application 14 determines, at 702, the wind direction 118 and determines, at 704, the wind magnitude 120. The wind direction 118 and the wind magnitude 120 are compared, at 706, with the vehicle dynamics 24 and the weather data 202, and the wind monitoring application 14 identifies, at 708, the object data 30 including the vehicle data 32 and the trailer data 34. At 710, the wind monitoring application 14 generates, via the criticality function 50, the criticality value 52. Based on the trailer data 34, the wind monitoring application 14 determines, at 712, whether the criticality value 52 exceeds the criticality threshold 54. If the criticality value 52 exceeds the criticality threshold 54, then the wind monitoring application 14 issues, at 714, the alert 70. If not, then the wind monitoring application 14 determines, at 716, based on the vehicle data 32, whether the criticality value 52 exceeds the criticality threshold 54. If the criticality value 52 exceeds the criticality threshold 54, then the wind monitoring application 14 issues, at 714, the alert 70. If not, then the wind monitoring application 14 continues to receive and monitor the wind data 116.

Figure 8:
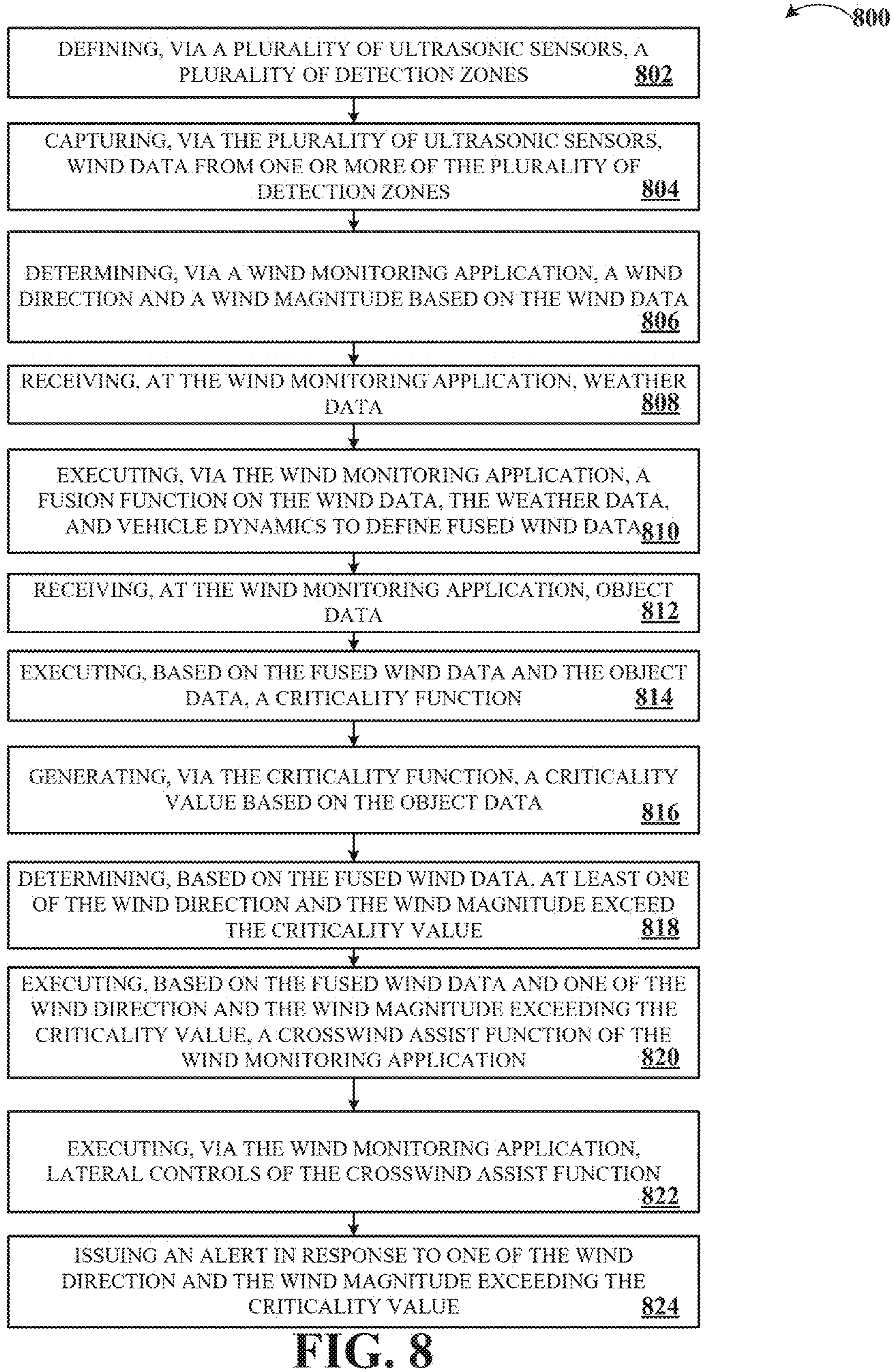
FIG. 8 is an exemplary method diagram for a wind monitoring system according to the present disclosure.

With reference to FIG. 8, a method 800 for the wind monitoring system 10 is illustrated. At 802, the wind monitoring system 10 defines, via a plurality of ultrasonic sensors 114, a plurality of detection zones 112. The plurality of ultrasonic sensors 114 capture, at 804, wind data 116 from one or more of the plurality of detection zones 112. The wind monitoring application 14 determines, at 806, a wind direction 118 and a wind magnitude 120 based on the wind data 116 and receives, at 808, weather data 202. At 810, the weather monitoring application 14 executes a fusion function 40 on the wind data 116, the weather data 202, and vehicle dynamics 24 to define fused wind data 42. The wind monitoring application, at 812, receives object data 30 and executes, at 814, based on the fused wind data 42 and the object data 30, a criticality function 50. The criticality function 50 generates, at 816, a criticality value 52 based on the object data 30.

At 818, the wind monitoring application 14 determines, based on the fused wind data 42, at least one of the wind direction 118 and the wind magnitude 120 exceed the criticality value 52. The wind monitoring application 14 executes, at 820, based on the fused wind data 42 and one of the wind direction 118 and the wind magnitude 120 exceeding the criticality value 52, a crosswind assist function 60 of the wind monitoring application 14. At 822, the wind monitoring application 14 executes lateral controls 62 of the crosswind assist function 60. The wind monitoring application 14 issues, at 824, an alert 70 in response to one of the wind direction and the wind magnitude exceeding the criticality value 52.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware causes the data processing hardware to perform operations comprising:

defining, via a plurality of ultrasonic sensors, a plurality of detection zones around a vehicle, the plurality of detection zones overlapping with one another;

capturing, via the plurality of ultrasonic sensors, wind data from one or more of the plurality of detection zones;

determining, via a wind monitoring application, a wind direction and a wind magnitude based on the wind data;

receiving, at the wind monitoring application, weather data from an off-board server via a network;

executing, via the wind monitoring application, a fusion function on the wind data, the weather data, and vehicle dynamics generated by an estimation model to define fused wind data;

executing, based on the fused wind data, a crosswind assist function of the wind monitoring application; and executing, via the wind monitoring application, lateral controls of the crosswind assist function.

2. The method of claim 1, wherein executing the crosswind assist function includes issuing an alert at a user interface of the vehicle.

3. The method of claim 1, further including receiving, at the wind monitoring application, object data.

4. The method of claim 3, wherein the object data includes vehicle data and trailer data, the trailer data including one or more of trailer dimensions, trailer mass, and axle count and the vehicle data including vehicle speed and steering angle.

5. The method of claim 3, further including executing, based on the fused wind data and the object data, a criticality function and generating, via the criticality function, a criticality value based on the object data.

6. The method of claim 5, wherein executing the crosswind assist function includes adjusting the lateral controls based on the criticality value.

7. The method of claim 5, further including determining, based on the fused wind data, at least one of the wind direction and the wind magnitude exceeds the criticality value.

8. The method of claim 7, further including issuing an alert in response to one of the wind direction and the wind magnitude exceeding the criticality value.

9. A wind monitoring system comprising:

data processing hardware; and memory hardware in communication with the data processing hardware, the memory hardware storing instructions that when executed on the data processing hardware cause the data processing hardware to perform operations comprising:

defining, via a plurality of ultrasonic sensors, a plurality of detection zones around a vehicle, the plurality of detection zones overlapping with one another;

capturing, via the plurality of ultrasonic sensors, wind data from one or more of the plurality of detection zones;

determining, via a wind monitoring application, a wind direction and a wind magnitude based on the wind data;

receiving, at the wind monitoring application, weather data from an off-board server via a network;

executing, via the wind monitoring application, a fusion function on the wind data, the weather data, and vehicle dynamics generated by an estimation model to define fused wind data;

executing, based on the fused wind data, a crosswind assist function of the wind monitoring application; and executing, via the wind monitoring application, lateral controls of the crosswind assist function.

10. The wind monitoring system of claim 9, wherein executing the crosswind assist function includes issuing an alert at a user interface of the vehicle.

11. The wind monitoring system of claim 9, further including receiving, at the wind monitoring application, object data.

12. The wind monitoring system of claim 11, wherein the object data includes vehicle data and trailer data, the trailer data including one or more of trailer dimensions, trailer mass, and axle count and the vehicle data including vehicle speed and steering angle.

13. The wind monitoring system of claim 11, further including executing, based on the fused wind data and the object data, a criticality function and generating, via the criticality function, a criticality value based on the object data.

14. The wind monitoring system of claim 13, wherein executing the crosswind assist function includes adjusting the lateral controls based on the criticality value.

15. The wind monitoring system of claim 13, further including determining, based on the fused wind data, at least one of the wind direction and the wind magnitude exceeds the criticality value.

16. The wind monitoring system of claim 15, further including issuing an alert in response to one of the wind direction and the wind magnitude exceeding the criticality value.

17. A wind monitoring system comprising:

data processing hardware; and memory hardware in communication with the data processing hardware, the memory hardware storing instructions that when executed on the data processing hardware cause the data processing hardware to perform operations comprising:

defining, via a plurality of ultrasonic sensors, a plurality of detection zones around a vehicle, the plurality of detection zones overlapping with one another;

capturing, via the plurality of ultrasonic sensors, wind data from one or more of the plurality of detection zones;

determining, via a wind monitoring application, a wind direction and a wind magnitude based on the wind data;

receiving, at the wind monitoring application, weather data from an off-board server via a network;

executing, via the wind monitoring application, a fusion function on the wind data, the weather data, and vehicle dynamics generated by an estimation model to define fused wind data;

receiving, at the wind monitoring application, object data;

executing, based on the fused wind data and the object data, a criticality function;

generating, via the criticality function, a criticality value based on the object data;

determining, based on the fused wind data, at least one of the wind direction and the wind magnitude exceeds the criticality value;

executing, based on the fused wind data and one of the wind direction and the wind magnitude exceeding the criticality value, a crosswind assist function of the wind monitoring application;

executing, via the wind monitoring application, lateral controls of the crosswind assist function; and issuing an alert in response to one of the wind direction and the wind magnitude exceeding the criticality value.

18. The wind monitoring system of claim 17, wherein the object data includes vehicle data and trailer data, the trailer data including one or more of trailer dimensions, trailer mass, and axle count and the vehicle data including vehicle speed and steering angle.

19. The wind monitoring system of claim 17, wherein executing the crosswind assist function includes adjusting the lateral controls based on the criticality value.

20. The wind monitoring system of claim 17, wherein issuing the alert in response to one of the wind direction and the wind magnitude exceeding the criticality value includes issuing the alert at a user interface of the vehicle.

* * * * *